(No Model.)
C. A. SCHIEREN.
DRIVING BELT.
No. 358,790. Patented Mar. 1, 1887.
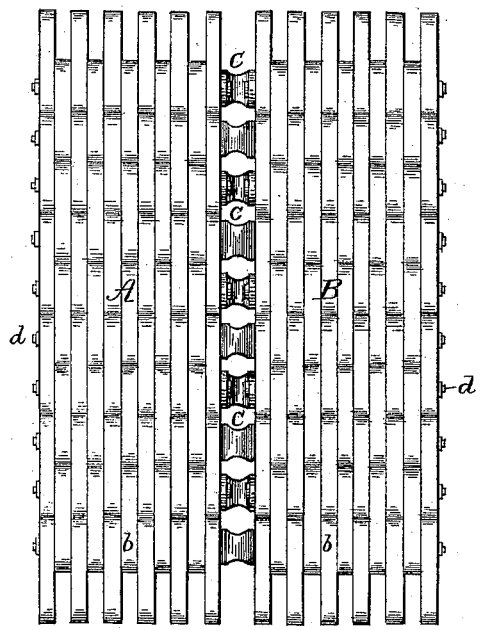
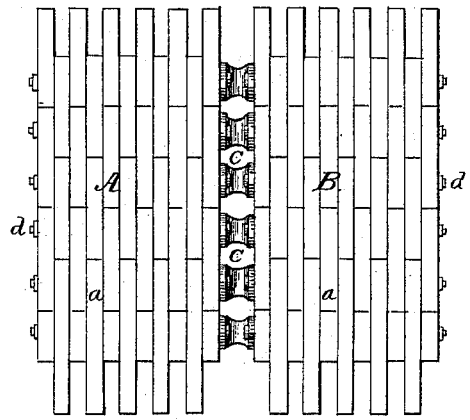
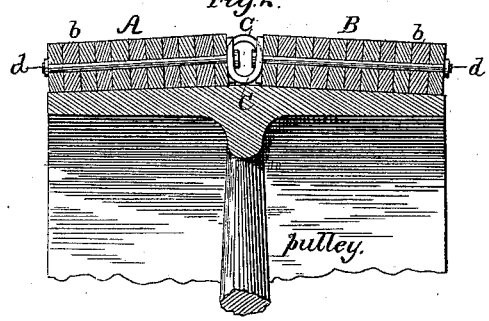
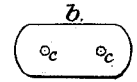
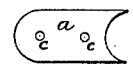
Attest:
G. W. H. Brown,
Frank Brawner.
Inventor:
Charles A. Schieren,
by C. B. Brock
Atty.

UNITED STATES PATENT OFFICE.

CHARLES A. SCHIEREN, OF BROOKLYN, NEW YORK.

DRIVING-BELT.

SPECIFICATION forming part of Letters Patent No. 358,790, dated March 1, 1887.

Application filed December 2, 1886. Serial No. 220,547. (No model.)

*To all whom it may concern:*

Be it known that I, CHARLES A. SCHIEREN, a citizen of the United States, residing at Brooklyn, in the county of Kings and State of New York, have invented certain new and useful Improvements in Driving-Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a plan view of a section of a link driving-belt to which I have applied my improvements. Fig. 2 is a transverse section of the same applied to a crown-pulley, partly broken away. Fig. 3 represents a section of a driving-belt embodying my improvements in a modified form. Fig. 4 is a detail view of a form of link which I may use in the construction of my improved belt. Fig. 5 is another form of link of which the belt may be composed. Fig. 6 represents the preferred form of transverse link which I employ for connecting the two or more parallel sections of belting.

Heretofore parallel sections of link driving-belts have been connected by flexible joints of leather or metal; but where leather transverse links have been used for making such connections they have been found to be too stiff and unpliable for the purpose. Such leather links were broad enough to allow for the passage therethrough of at least two adjacent link-bolts in each parallel section of belting—a construction which renders the belt unduly rigid and stiff, especially in passing over small pulleys.

My improvements consist in transverse flexible links of the character above referred to, and arranged to alternate with each other, as shown in Figs. 1 and 2, and their manner of connection to the parallel belt-sections.

In the drawings, A represents one parallel section of link-belting, and B the adjacent section. These belt-sections may be made or built up of any desired width and length, from the concavo convex link *a*, shown in Fig. 4, or from the double convex link *b*, shown in Fig. 5.

When made from the concavo-convex link *a*, the convex end of one link is made to abut against the concave end of the adjoining link, and the link-bolts *d* are passed through the holes *c* in the link, and break joints with each other, as is clearly shown in Fig. 3. When the rounded convex link *b* is used in forming the belt, it is immaterial which end of the link abuts against the other. The bolts *d* are secured in the same way, and the links break joints with each other—that is, the link-bolt passes through one end of one link, through the opposite end of the next link, and so on through the width of the belt-section.

Fig. 6 shows the form of the transverse link C. It is cut away about its mid-length, in order to give a maximum degree of flexibility.

The inner end of each link-bolt *d* of section A of the belt passes through the hole *e* of one of the transverse links C, and is riveted thereto, while the other end of the link is secured to the inner end of the opposite link-bolt *d* in the parallel section B of the belt.

The arrangement of the transverse links C is such that they alternate with each other, as shown in Figs. 1 and 2—that is, the bend of each adjacent link is in an opposite direction from that of the adjoining one. By alternately reversing the transverse link sufficient flexibility is obtained to make the belt lie perfectly upon either a flat or a crowned pulley. The alternately-attached links act to brace the belt throughout its entire width, and to form an even perfect bearing.

This method of connecting the belt-sections is especially adapted for belts which work over what are termed "quarter-turn" pulleys, where, if the links were not alternately reversed, there would be present a constant tendency to pull and strain the belt. The alternately-reversed transverse links also prevent any tendency of the belt to open too wide between the parallel belt-sections.

The links *a* and *b*, as also the transverse link C, may be made of any known material other than leather which may be found suitable for the purpose.

What I claim is—

In a driving-belt, composed of two or more parallel sections, a series of alternately-reversed flexible transverse links connecting the belt-sections.

In testimony whereof I affix my signature in presence of two witnesses.

CHAS. A. SCHIEREN.

Witnesses:
F. A. M. BURRELL,
CHAS. J. SCHLEGEL.